United States Patent
Brooker et al.

(10) Patent No.: US 10,037,750 B2
(45) Date of Patent: Jul. 31, 2018

(54) SYSTEMS AND METHODS FOR ANALYZING COMPONENTS OF AUDIO TRACKS

(71) Applicant: RMXHTZ, Inc., Nashville, TN (US)

(72) Inventors: Sam Brooker, Nashville, TN (US); Eugene Melnichenko, Nashville, TN (US); Matt Wilder, Nashville, TN (US); Seth Johnson, Nashville, TN (US)

(73) Assignee: RMXHTZ, INC., Nashville, TN (US)

( * ) Notice: Subject to any disclaimer, the term of this patent is extended or adjusted under 35 U.S.C. 154(b) by 0 days.

(21) Appl. No.: 15/435,664

(22) Filed: Feb. 17, 2017

(65) Prior Publication Data

US 2017/0236504 A1 Aug. 17, 2017

Related U.S. Application Data

(60) Provisional application No. 62/296,392, filed on Feb. 17, 2016, provisional application No. 62/341,297, filed on May 25, 2016.

(51) Int. Cl.
| | |
|---|---|
| *G10H 1/36* | (2006.01) |
| *G10H 1/00* | (2006.01) |
| *G06Q 50/18* | (2012.01) |

(52) U.S. Cl.
CPC ......... *G10H 1/0008* (2013.01); *G06Q 50/184* (2013.01); *G10H 2210/125* (2013.01);
(Continued)

(58) Field of Classification Search
CPC .......... H04S 2400/01; G10H 2250/235; G10H 2250/285; G10K 11/1786
See application file for complete search history.

(56) References Cited

U.S. PATENT DOCUMENTS 8,168,877 B1 * 5/2012 Rutledge ............ G10H 1/38
84/613
8,426,715 B2 * 4/2013 Bregar ............ G11B 20/10527
84/611

(Continued)

OTHER PUBLICATIONS https://web.archive.org/web/20151007051756/http://www.justinsalamon.com/melody-extraction.html The web page was publicly viewable as of Oct. 7, 2015.

(Continued)

*Primary Examiner* — Marlon Fletcher
(74) *Attorney, Agent, or Firm* — Baker Donelson

(57) ABSTRACT

A method is described comprising receiving a stem signal and an audio mix signal, wherein the audio mix signal comprises information of the stem signal. The method includes applying a first transform to the stem signal to provide a first stem spectrum, applying a second transform to the stem signal to provide a second stem spectrum, generating a plurality of mix signals using the audio mix signal, applying a first transform to each mix signal of the plurality of mix signals to provide a corresponding first mix signal spectrum, applying a second transform to each mix signal of the plurality of mix signals to provide a corresponding second mix signal spectrum, and using information of the first stem spectrum, the second stem spectrum, a first mix signal spectrum, or a second mix signal spectrum to detect the information of the stem signal in the audio mix signal.

30 Claims, 13 Drawing Sheets

(52) U.S. Cl.
CPC . *G10H 2240/141* (2013.01); *G10H 2250/235* (2013.01); *G10H 2250/285* (2013.01); *G10H 2250/305* (2013.01)

(56) References Cited

U.S. PATENT DOCUMENTS

| | | | | |
|---|---|---|---|---|
| 9,317,561 | B2* | 4/2016 | Resch | G06F 17/3053 |
| 2007/0017344 | A1* | 1/2007 | Stoneback | G10H 1/0091 |
| | | | | 84/600 |
| 2008/0066609 | A1* | 3/2008 | Bourgeois | G10H 1/0025 |
| | | | | 84/609 |
| 2010/0307321 | A1* | 12/2010 | Mann | G06F 3/0481 |
| | | | | 84/613 |
| 2011/0214556 | A1* | 9/2011 | Greyson | G10H 1/40 |
| | | | | 84/611 |
| 2012/0195433 | A1* | 8/2012 | Eppolito | H04S 3/008 |
| | | | | 381/1 |
| 2014/0044273 | A1* | 2/2014 | Hashimoto | G10L 21/0232 |
| | | | | 381/66 |
| 2014/0053710 | A1* | 2/2014 | Serletic, II | G10H 7/00 |
| | | | | 84/609 |
| 2014/0053711 | A1* | 2/2014 | Serletic, II | G10H 1/38 |
| | | | | 84/611 |
| 2014/0056432 | A1* | 2/2014 | Loui | G10L 25/51 |
| | | | | 381/56 |
| 2014/0270263 | A1* | 9/2014 | Fejzo | G10H 1/125 |
| | | | | 381/119 |
| 2015/0139446 | A1* | 5/2015 | Tawada | G10L 21/0208 |
| | | | | 381/94.2 |
| 2017/0178664 | A1* | 6/2017 | Wingate | G10L 21/0308 |
| 2017/0236504 | A1* | 8/2017 | Brooker | G10H 1/0008 |

OTHER PUBLICATIONS

J. Salamon and E. Gómez, "Melody Extraction from Polyphonic Music Signals using Pitch Contour Characteristics", IEEE Transactions on Audio, Speech and Language Processing, 20(6):1759-1770, Aug. 2012.

* cited by examiner

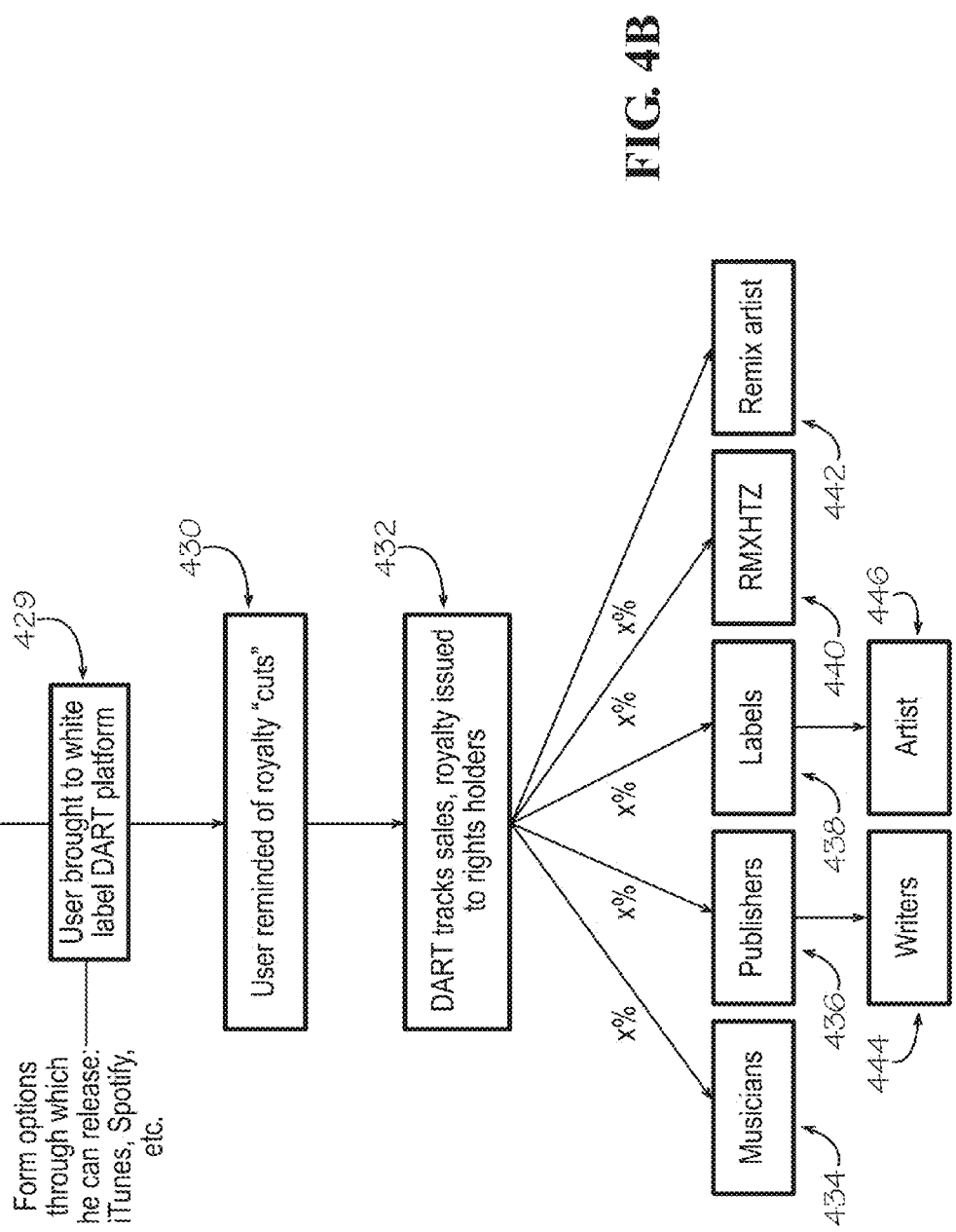

SYSTEMS AND METHODS FOR ANALYZING COMPONENTS OF AUDIO TRACKS

CROSS REFERENCE TO RELATED APPLICATIONS

This application claims the benefit of U.S. patent application Ser. No. 62/296,392, filed Feb. 17, 2016, and U.S. patent application Ser. No. 62/341,297, filed May 25, 2016.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

A remix comprises a piece of media which has been altered from its original state by adding, removing, and/or changing pieces of the item. A song, piece of artwork, book, video, or photograph can all be remixes. The only characteristic of a remix is that it appropriates and changes other materials to create something new. Systems and methods are described herein for analyzing remixed audio tracks for the improvement upon existing royalty negotiation processes among music industry stakeholders and to fairly split royalties among those parties holding rights in some or multiple portions of the remix track.

BRIEF DESCRIPTION OF THE DRAWINGS

So that the manner in which the present application can be better understood, certain illustrations and figures are appended hereto. It is to be noted, however, that the drawings illustrate only selected embodiments and elements of the systems and methods for analyzing stem components of audio files described herein and are therefore not to be considered limiting in scope for the systems and methods described herein may admit to other equally effective embodiments and applications.

FIG. 4B shows the workflow of a back-end remix upload process, under an embodiment.

DETAILED DESCRIPTION

Figure 1:
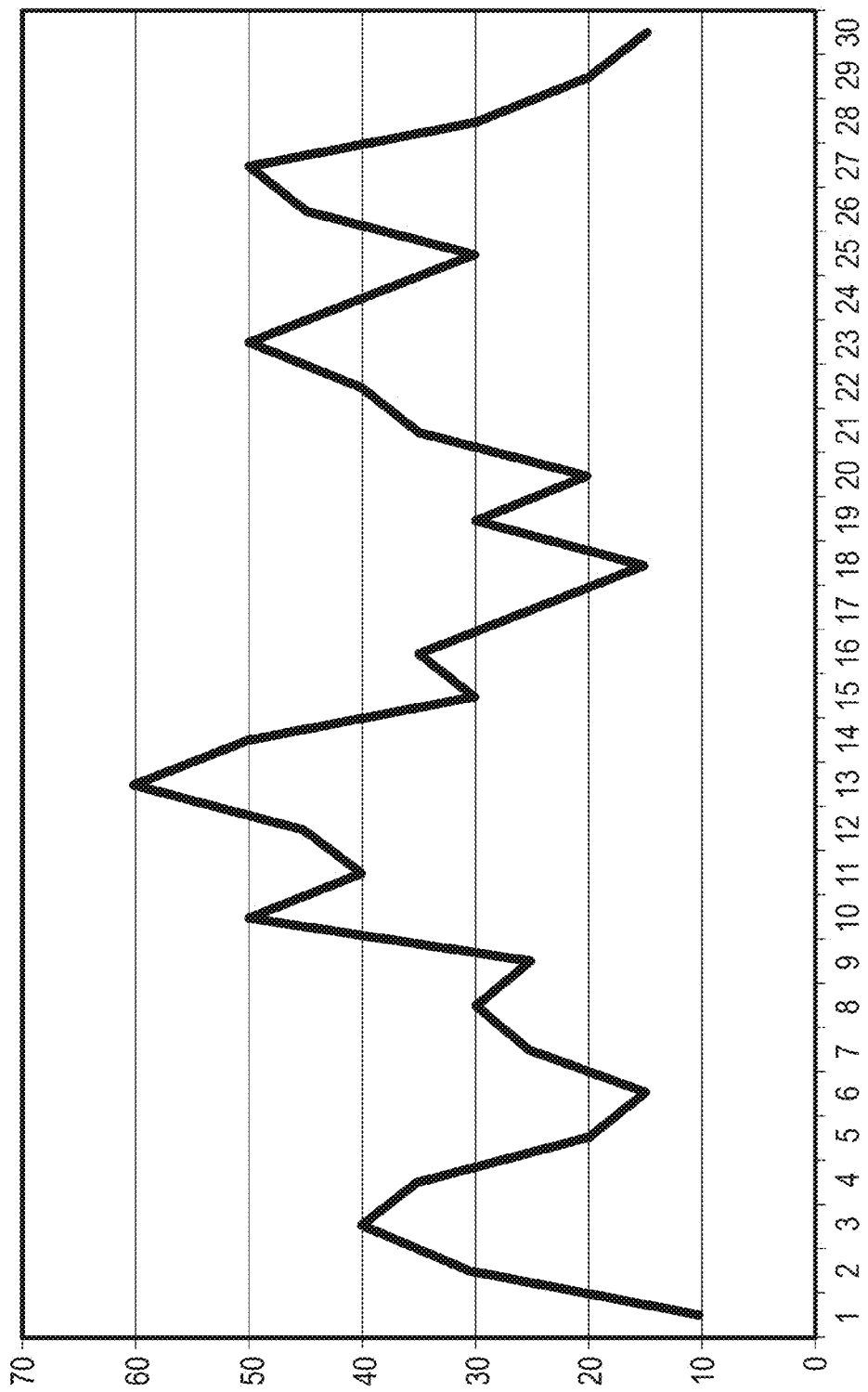
FIG. 1 shows a plot of FFT windows versus magnitudes, in an embodiment.

Remix and derivative works are some of the fastest growing music creations today. But unfortunately for both remixers and original rights holder, the current royalty negotiation process is not able to keep up with speed of creation. The Remix Hits Company (referred to as "Remix" or "Remix Hits") provides DJ producers the license to desired music while fairly compensating the entire music ecosystem including artists, songwriters, session musicians, recording artists, labels, publishers and producers.

Remix has developed a two sided product: first, a hit song virtual instrument for creatives and second, a copyright management system that keeps up with the speed of music creation. On the front end a virtual instrument comprises an instrument tool that provides producers with official content from hit songs that may be included in the producer's remixes and derivative works. The front end interface provides sounds from hit songs including vocals, guitars, drums, etc. A DJ producer may then use the various sounds to produce remix audio tracks.

As just one example, a DJ producer may sample sounds from a well know country music song and then mix those sampled/modified portions with samples from another well-known Latin song. The combination produces an entirely new sound. It is clear to see that the possibilities are endless. However, the problem of royalty attribution still exists. This is the role of Remix Hit's copyright management system that automatically analyzes the remix product itself in order to determine royalty splits as described in greater detail below.

Systems and methods are described herein for creating and analyzing remix files including watermarking stems used to create remixes and identifying within produced remixes those stems embedded in the remix product. The systems and methods for creating and analyzing remix files are hereinafter referred to as the platform, the Remix platform, the Remix Hits platform, the Remix Hits system, the (Hit)strument, or the (Hit)strument platform. Note that the term (Hit)strument may be replaced with the term RELEASE.

Purchase

A user of the Remix Hits platform purchases a zipped folder of files with an install guide under an embodiment. The install guide walks a user through installation process and explains the overall Remix approach in (i) providing a creative interface (including access to copyrighted content) for generating remix audio product and (ii) providing automatic royalty splits with respect to such product and therefore immediate commercial viability on the back end of the process. The use and general operation of such platform are described further below.

Platform

Remix Hits under one embodiment uses the open architecture KONTAKT 5 PLAYER Virtual Studio Technology (VST) plugin platform. KONTAKT 5 PLAYER is a free sample player based on KONTAKT technology developed by Native Instruments. Further, the KONTAKT 5 PLAYER allows for innovative, highly playable instruments.

Converting Files

Stems

Under one embodiment, Remix receives and converts stems for use in the Remix Hits platform as further described below. Stems are under an embodiment elements of a final mix that have been isolated as their own stereo mix. These stems can then be combined in parallel, using the same starting point, to create a similar version of the main stereo mix but with slight changes as needed. In film and post-production audio it has always been common to work with stems—elements of the final mix broken out into various subgroups. Dialog, music, sound effects, background sounds and such are all submixed into surround or stereo tracks for ease of final film audio mixing. This allows for control over the sound without having to monitor hundreds, or thousands, of tracks.

In music mixing for recordings and for live sound, stems are subgroups of similar sound sources. Stems may facilitate the job of the final mix engineer. Such stems may consist of all of the string instruments, a full orchestra, just background vocals, only the percussion instruments, a single drum set, or any other grouping that may ease the task of the final mix. Stems prepared in this fashion may be blended together later in time, as for a recording project or for consumer listening, or they may be mixed simultaneously, as in a live sound performance with multiple elements Stems may be supplied to a musician in the recording studio so that the musician can adjust for example a headphones monitor mix by varying the levels of other instruments and vocals relative to the musician's own input. Stems may also be delivered to the consumer so they can listen to a piece of music with a custom blend of the separate elements. Further stems may be delivered to producer/remixers as described herein for use in creating new and innovative remix tracks.

Conversion

As indicated above, Remix receives and converts stems for use in the Remix Hits platform as further described below. Remix Hits breaks out stems into smaller building blocks. It should be noted that Remix provides software that maps stems of songs to individual keys of an MIDI keyboard. A user may purchase a copyrighted song via Remix Hits for use in a Remix project. In essence, the user has purchased a software mapping of stems to MIDI keyboard keys. As one example, an entire vocal line is broken up into smaller phrases so each phrase corresponds with a key on an MIDI keyboard. Under one embodiment, the (Hits)trument platform uses 2 different ways to break stems into building blocks:

Multiloop suite (each ~4-bar musical phrase corresponds to a MIDI key), allowing users to "audition" all stem groups, from drums to guitars to vocals etc. Phrases are subordinate components of a stem. The multiloop suite exposes granular components of the stem to the user. In this manner, a user may sample any four bar phrase of a vocal stem for example.

Singleshot menu: each phrase is broken down into a single transient. A single drum hit, guitar strum, vocal word. Just as phrases are subordinate to stems, so are transients subordinate to phrases. The single shot menu exposes an additional level of granularity to the user. The user may now sample single transients of the ~4 bar musical segments, i.e. a single phrase corresponding to a sung word.

Watermarking

Under an embodiment, Remix Hits receives stems from copyright holders (label, artist, master owners, etc.).

Under an embodiment, Remix Hits digitally watermarks each individual stem. Watermarked stems will be placed in the online Remix Hits stem repository which is part of the Remix Hit's overall database.

Remix Platform Use

Under an embodiment, Remix users (i.e. music creators) are able to print any and all stems/samples into their digital audio workstation with the permission to modify them in any way they please. Such modifications includes, but are not limited to cutting/chopping of samples, filtering, pitch shifting, tempo changing, reversing, EQing, and compressing. In other words, a user of the Remix Hits platform may freely use stems across all copyrighted stems (available with the Remix platform) in any combination to create new and innovative remix product.

Under one embodiment, the (Hits)trument is for individual use only. Under such embodiment, each user must purchase his/her own copy of the (Hits)trument software in order to legally use and exploit copyrighted samples in the user's remix product. The (Hits)truments software may not be copied and transferred to another user. Further under such embodiment, the StemScanner (described further below) may not let a user post a new remix made with a duplicate copy of the (Hits)truments software.

Back-End Re-Upload Process

Stem Analysis

Under an embodiment, a user producer/creator uses the Remix platform to complete a remix. Thereafter, the user/creator has the ability to upload the creation to the web-based Remix Hits platform. The user may initially use the KONTAKT 5 PLAYER to generate the remix product and save it as a .wav file or .mp3 file. The user may then navigate to a web based platform and log into the copyright management backend application. Under this embodiment, the user may upload the audio for analysis as further described below. Alternatively, the user may simple navigate between a creatives front end and copyright management backend using a single application/interface that incorporates both components.

Under an embodiment, the upload is analyzed for original and copyrighted material by the StemScanner file reading technology. By talking back with the watermarked stem database/repository, the StemScanner reads and recognizes copyrighted, watermarked stems in their original format and those that are modified: pitch shifted, sped up, slowed down, reversed, chopped up (unless cut to unrecognizable sample. The StemScanner may output precise usage data in a format shown in FIG. 3 below.

Stem Detection and Watermarking Algorithm

Introduction here is a demand for a service that detects original stems after such stems are mixed with other sounds.

Basic Principle of Operation

Under one embodiment, peak amplitudes are horizontally identified at discrete frequency levels of a stem as further described below. The peaks and corresponding frequency levels are recorded in a database. Later remix product or "sample" audio files are analyzed to identify horizontal peak occurrences at the same set of frequency levels. The peak values are then correlated with peak occurrences in the database samples with respect to the discrete frequency levels. Correlation values may be used to identify the presence of stems in the remix. In other words, correlation result shows a probability of a mix containing a sample.

Under an alternative embodiment, each audio file is "fingerprinted" by a process in which reproducible hash tokens are generated. Under one embodiment, a hash token comprises a Time:Freq:Value triplet. Fingerprint information is stored into a database with additional information describing the audio file. Both "database" and "sample" audio files are subject to the same process. A set of tokens extracted from a "sample" audio file contains under an embodiment a subset of "database" hashes and extra hashes for mixed-in sounds, i.e. remixed content. The system performs a reverse search with respect to the final remix product to find a best matching "database" set of hashes. The hash set with best matching above some threshold is considered a match under an embodiment.

Peak Extraction

Every music sound comprises a frequency and magnitude combination. For describing "database" sound the Remix Hits platform performs an analysis of a spectrogram with respect to a stem and generates hashes or extracts peak values that uniquely describe the stem.

A spectrogram may shows a number of frequencies with amplitudes above some threshold. However non-valuable frequencies will be masked when mixed with other sounds. This happens due to FFT algorithm frequency resolution limitation and spectrum leak effect. The latter may can be minified by applying spectral window functions, however it is not possible to fully eliminate this effect. In order to build hashes or extract peak values with respect to valuable frequencies, the Remix Hits StemScanner may only search for a harmonic series of each frequency that contributes to sounds subject to human perception.

The Remix Hits platform tracks pitch "contours" to define the "melody" of a sound file, i.e. a stem. Out of pitches the StemScanner identifies only the most significant ones. The Remix Hits database may contain under an embodiment original values of peak amplitudes.

Then the Remix Hits platform may remove isolated pitches and keep continuous contours only. The continuous contours represent substantially continuous lines, i.e. line segments substantially free of breaks. Under one embodiment, single spikes are removed but not short lines.

At this point the Remix Hits platform has extracted pitches that would most probably be transferred to final composition after mixing with other sounds. In other words, these extracted pitches would most likely survive the remixing process and appear as recognizable pitches within the remix product. Peaks are identified under an embodiment as a set of local maximum value candidates in a contour.

Under one embodiment, peaks of the extracted pitches are then "horizontally" catalogued. The StemScanner may identify and record peaks at a frequency level over the length of the stem. For example, the StemScanner may (i) record peak values at 100 Hz, (ii) record peak values at 200 Hz and (iii) record peak values at 300 Hz. These horizontally catalogued peak values are then stored in a database with respect to frequency levels. These values are generated and stored for every stem in the database. Of course, this process is described with respect to only three frequency levels (100 Hz, 200 Hz, and 300 Hz) for the purpose of simplicity and embodiments are not so limited.

Given a remix product for analysis, the StemScanner conducts under one embodiment a reverse analysis to identify stems within the remix. The StemScanner may analyze the remix at five second intervals and horizontally extract amplitudes within each such interval. (It should be understood that shorter or longer time intervals may be used under alternative embodiments. Note that with respect to a mix the reverse analysis does not necessarily extract a peak. Rather the amplitude value is extracted at specific moments of time at a specific frequency. These amplitudes will be correlated with corresponding amplitudes from the database). Continuing with the example involving three frequency levels (100 Hz, 200 Hz, and 300 Hz), the StemScanner analyzes the first five second interval and extracts under an embodiment (i) amplitude values at 100 Hz, (ii) amplitude values at 200 Hz and (iii) amplitude values at 300 Hz. The StemScanner may continue this process for every five second interval in the remix.

The StemScanner may then correlate peaks within each time segment of the remix at the 100 Hz level, 200 Hz level, and 300 Hz level with each database stem, i.e. with the number of corresponding peaks identified in a stem at a matching frequency level. If there is a high correlation between identified number of peaks within a remix time segment and within a particular stem at one or more frequency levels, the correlation provides evidence of the stem's use in the remix.

The Remix platform may under an alternative embodiment utilize the Shazam algorithm to create robust time, frequency, and magnitude constellations based on a melody.

These constellation are saved into database and uniquely identify the stem. Every link in a constellation may be used to create a hash. The hash contains a frequency of both a particular peak and timespan between them, i.e. between anchor peak and all peaks in a target zone. A constellation has a star topology and anchor peak is in the middle of that "star". The separate components allow for flexible matching either by time with variable pitch or by pitch with variable time.

Fingerprinting Using Formants

In order to improve detection rate, additional information is under an embodiment extracted and stored among with melody hashes or peak information.

Every vocal or instrument pitch may described by a fundamental frequency and additional frequencies that creates a timbre of a sound. These frequencies are unique to each instrument and voice and are called "formants". The Remix Hits platform may extract formants with respect to stems and store the formants among hash/peak information in the database. Extracting formants from the stem helps to uniquely identify not only a melody but a timbre corresponding to performance of the melody. If, in addition to hash/peak information, formants found in "database" file matches formants found in "sample" file then this match indicates an exact instrument/voice match under an embodiment.

Formants are more about human voice. If one tries to sing "A" and "U" at the same pitch—fundamentals will be the same but additional frequencies (formants) will be different. So if one sings Jingle Bells using the letters "A-A-A . . . A-A-A . . ." then this voicing will have the same fundamental frequencies as "Jingle Bells Jingle Bells" sung at the same pitch. This means that the Remix Hits software will see very high correlation between the two voice segments under an embodiment. This additional introspection provides a form of "formant inspection" under an embodiment.

Detection Process

To recognize stems within a "sample" file it is under one embodiment analyzed by extracting amplitudes. A reverse match algorithm then perform a comparison of "database" hashes with amplitude values. The "database" candidate matching the best over specified threshold is considered a "match". Matching may also occur using "horizontal" correlation of amplitude values at discrete frequency levels extracted at particular points in time as further described above. If a "database" file includes formants stored among with hashes, the Remix Hits platform tries to match the formants as well. Matched formants increases match rate by confirming that the same timber is used in a "database" file and a "sample" file. This, in particular, important for voice matching. Since voice is hard to falsify, matched formants provide the same voice used in a "sample" file.

Watermarking

Watermarking is the process of adding additional information into a sound file that could be carried over to re-compressed file and extracted later in order to determine sound origin. There are multiple watermarking technologies available based on the addition of some minor noise that does not affect the general quality of the audio perception and can be extracted later. Due to mixing original track with other sounds the noise in most cases would be masked by frequencies of added sounds.

The Remix platform implements under an embodiment an algorithm to modify original sound such that the modification is not affected by adding more sounds. To achieve this goal the Remix Hits system modifies original sound by subtracting a magnitude of frequency peaks in a repeated manner. The Remix Hits platform modifies under an embodiment one peak in every window (in FFT terms). To eliminate audibility of the change an embodiment modifies not the most significant peak but one with lower amplitude which is most likely not a fundamental, thus not affecting hearing of the sound.

Figure 2:
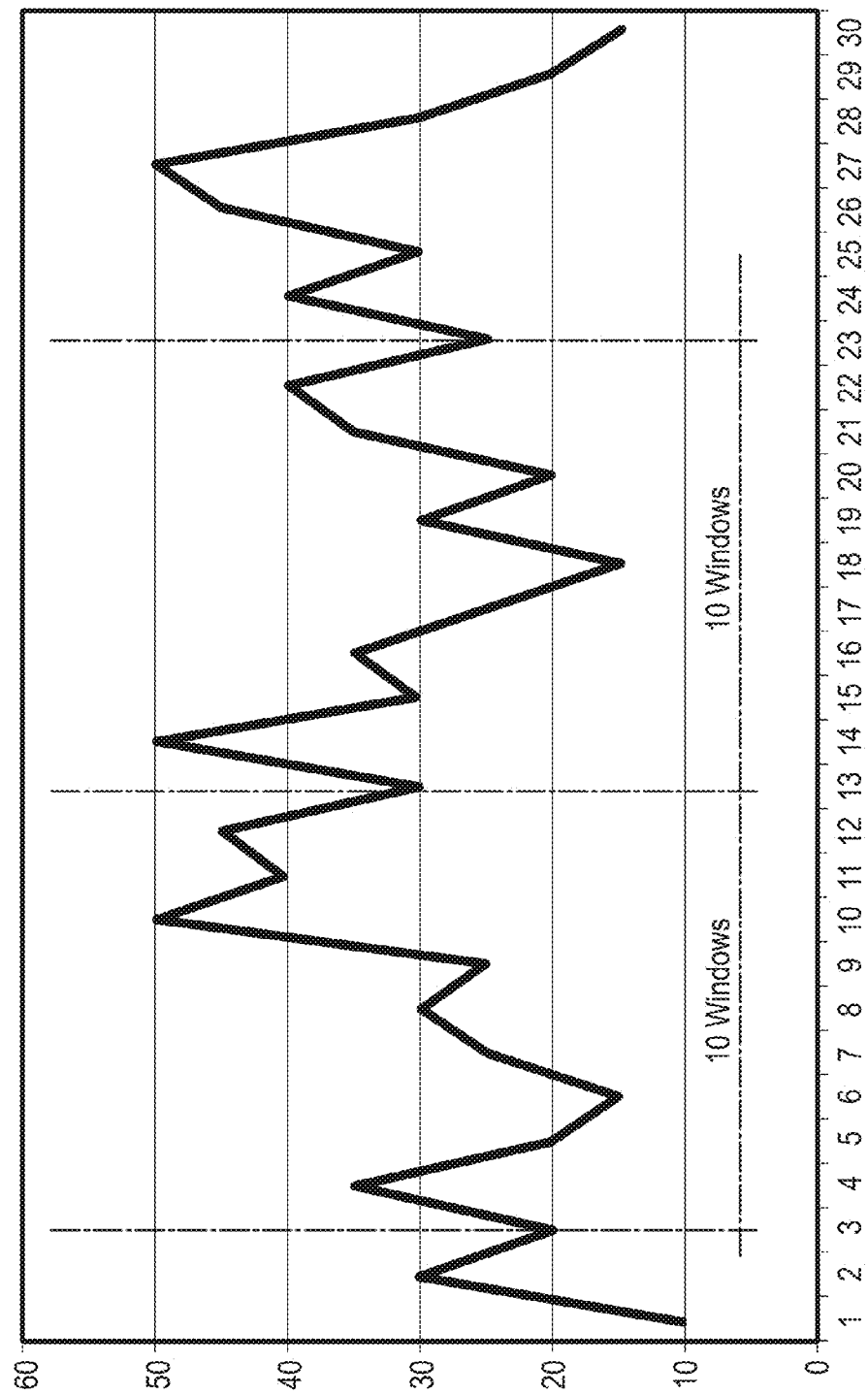
FIG. 2 shows a plot of FFT windows versus magnitudes, in an embodiment.

FIG. 1 and FIG. 2 show illustrates magnitude before and after the watermarking process. Note that in each figure, the x-axis comprises FFT windows and the y-axis comprises magnitude values. In particular, FIG. 2 shows FFT windows increments in intervals of 10.

It's shown that every 10 windows (in FFT terms) magnitude of a selected frequency is artificially dropped down. This magnitude drop may carry over to a mix environment and survive even if nearby frequencies affect magnitudes of the marked frequency.

To improve robustness of this algorithm, multiple frequencies will be affected by watermarking process.

The modified sound is not combined with an original one under an embodiment. The pipeline of an embodiment looks like the following:
1. load original stem
2. forward FFT
3. analyze and modify peaks in spectrum
4. inverse FFT
5. save watermarked stem
Thus, the modified sound only is distributed.

Stem Analysis

As already indicated above, a user producer/creator uses the Remix platform to complete a remix. Thereafter, the user/creator has the ability to upload the creation to the web-based Remix Hits platform. The upload may then be analyzed for original and copyrighted material by the StemScanner file reading technology. By talking back with a stem database/repository, the StemScanner reads and recognizes copyrighted, watermarked stems in their original format and those that are modified: pitch shifted, sped up, slowed down, reversed, chopped up (unless cut to unrecognizable sample. The StemScanner may output precise usage data in a format shown in FIG. 3.

Figure 3:
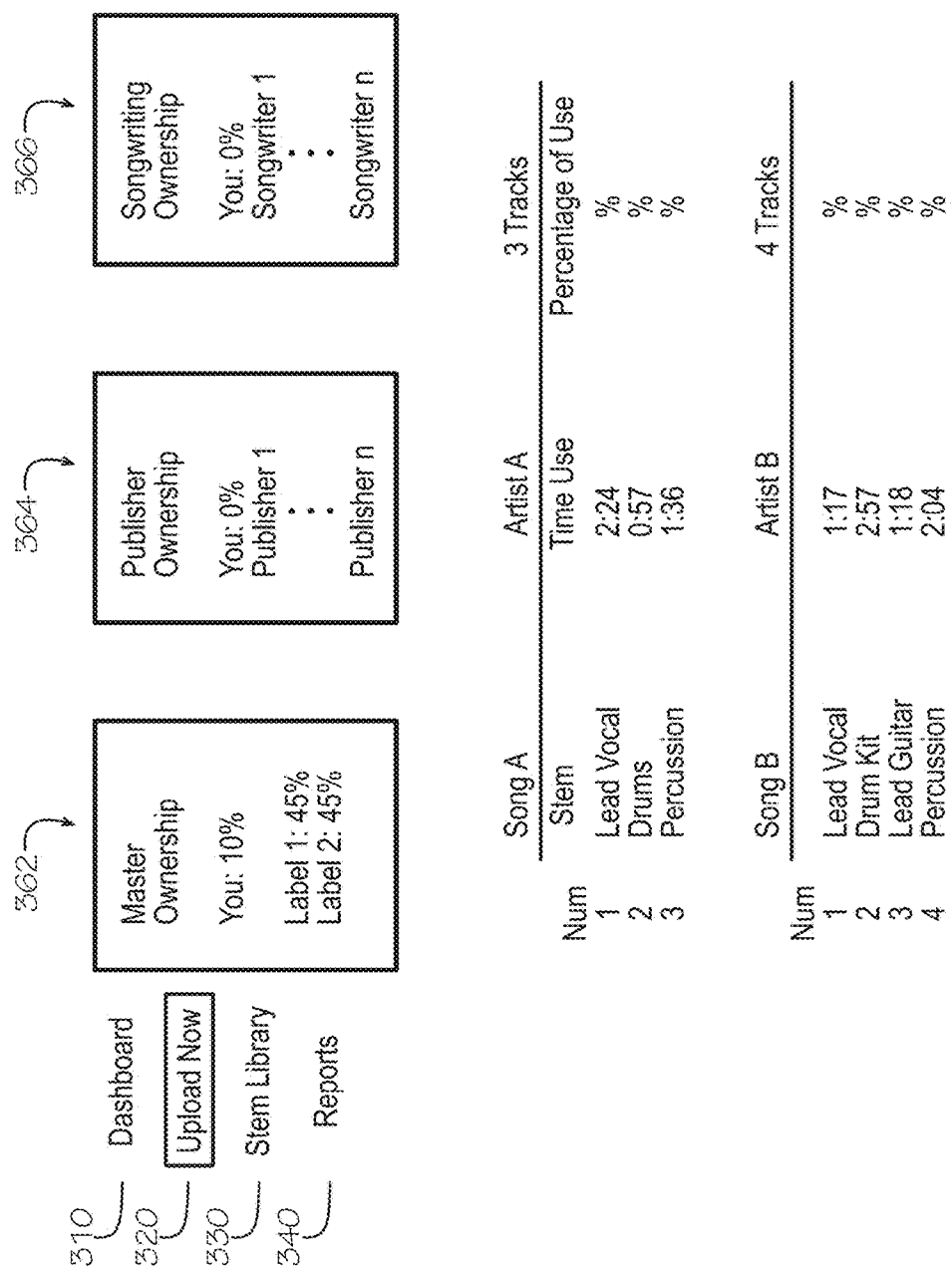
FIG. 3 comprises a screenshot of a royalty split layout made available to clients, under one embodiment.

FIG. 3 shows an Remix Hits platform interface. Left side tabs of the interface provide user an ability to navigate among a Dashboard 310 page, an Upload Now 320 page, a Stem Library 330 page and a Reports 340 page. The Dashboard page presents a user with instruments and tools for production of remix product as already described above. The Stem Library page directs a user to the comprehensive catalogue of stems available to user in the remix process. The Reports page may provide the user with a history of user's royalties.

FIG. 3 shows that the Upload Now 320 tab has been selected. Further, FIG. 1 shows Scan Results indicating that a user has uploaded a remix for StemScanner analysis. The Scan Results comprise Master Ownership 362, Publishing Ownership 364 and Songwriting Ownership 366. Further the Scan Results may also present tracks used in the remix, i.e. tracks from Artist A and tracks from Artist B. For example, FIG. 3 shows that three stems of Artist A's song were used. FIG. 3 also provides corresponding time of use and percentage of use for each stem. The Scan Results of FIG. 3 also shows that four stems of Artist B's song were used. FIG. 3 also provides corresponding time of use and percentage of use for each stem. Under one embodiment, percentage of use simply captures the use of a particular stem in view of all stems collectively used in the sample.

The StemScanner may then use the percentage of use numbers to provide a royalty split between the two artists or their labels. However, not all stems are created equally. For example, a lead vocal extracted from a song may be instantly recognizable despite limited use relative to other stems. The recognizability of the stem may correspond to the extreme popularity of the artist and/or extreme popularity of the song. In contrast a drum stem may hardly be recognizable despite its significant use within the remix product relative to other stems. Therefore, it may not be equitable to use raw "percentage of use" numbers to generate splits.

In order to calculate the total "master royalty" owed to the remixer vs. the copyright holder under one embodiment, percentage of use values may be weighted using a point system. Under such system, stems may be assigned points corresponding to their recognizability. These points may then function as multipliers to increase ownership rights with respect to more recognizable stems. As an example, vocal lines (or the most recognizable stem according to the rights holder) may be assigned 5 hypothetical points because of its recognizability; drums only may be assigned 1 point; guitar parts may be assigned 2; customized, recognizable synths may be given 4, etc.

FIG. 3 shows that the copyright back end application of the Remix platform including StemScanner analysis has assigned a master ownership 362 split. Under such embodiment, the Remix platform awards 10% ownership to the remix creator and then 90% to the music labels (equally split at 45% each). Under one embodiment, there may be a higher level predetermined royalty split between master ownership 362, publishing ownership 364, and songwriting ownership 366. Under such embodiment, the master ownership percentages are applied after application of the higher level royalty split. FIG. 3 also shows a list of publishers (1-n) maintaining publishing ownership 364 percentages. Further, FIG. 3 also shows a list songwriters (1-n) maintaining songwriting ownership 366 percentages. Under one embodiment, previous agreements between songwriters and publishers may determine the further split of royalties between such parties.

Under an embodiment, rights holders may have the ability to rank stems from most to least recognizable before Remix Hits integrates them into the (Hits)trument platform. Accordingly, clients are satisfied with the fractional royalty split due to the fact that clients have an opportunity to rank their most recognizable and most valuable stems.

Under an embodiment, the remixers and the copyright holders are guaranteed minimum royalty percentages on every new master. The remixer may always be assigned at least 10% for his/her work regardless of the amount of manipulation done to create the remix. The original rights holder may always receive at least 10% for allowing use of their property.

Figure 4A:
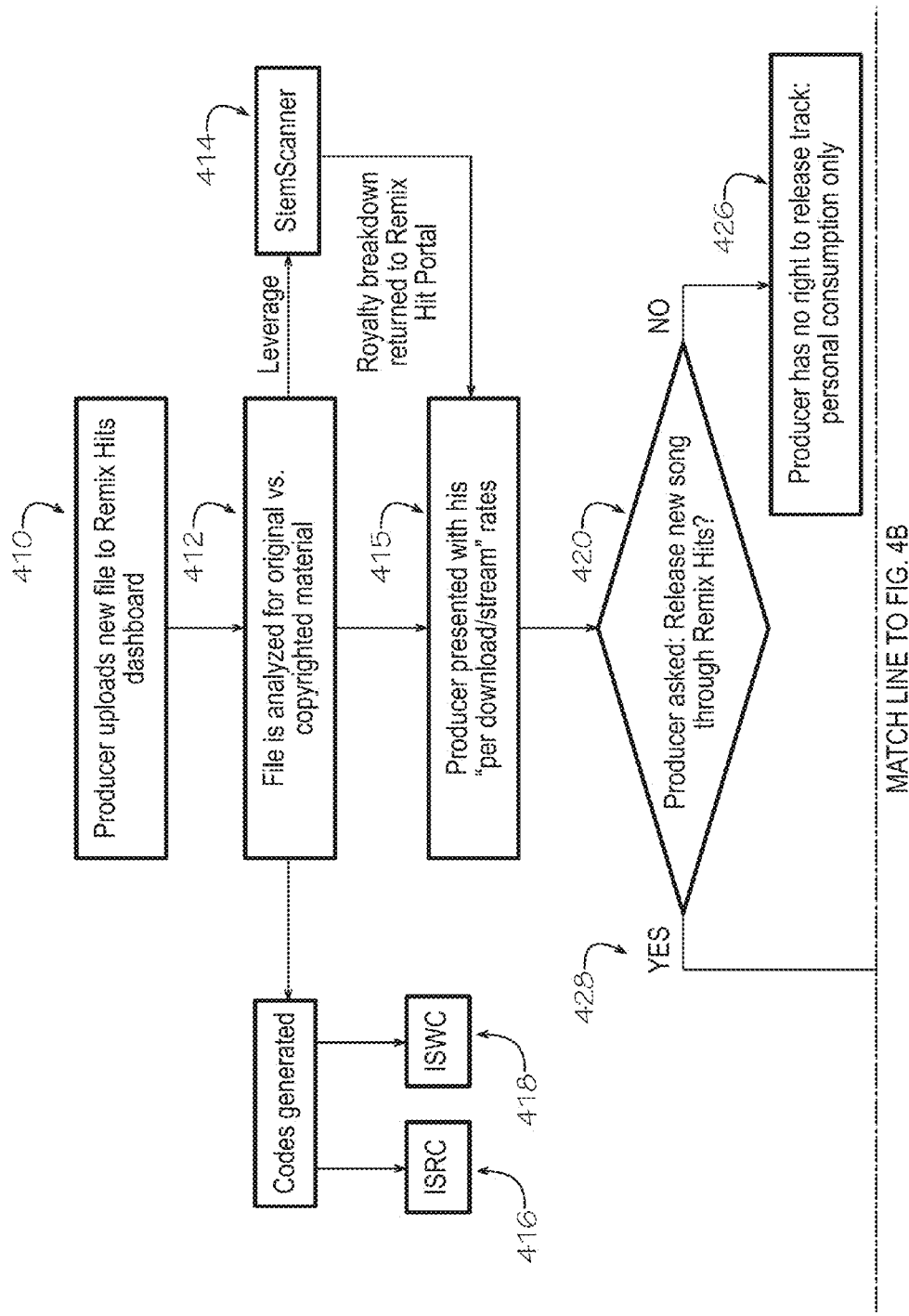
FIG. 4A shows the workflow of a back-end remix upload process, under an embodiment.

FIGS. 4A and 4B shows workflow of a back-end remix upload process under an embodiment. Step 410 includes a producer that uploads new files to the Remix Hits dashboard. Steps 412, 414 includes the StemScanner analyzing the file/upload for original versus copyrighted material. In step 416, 418 ISRC and ISWC codes are assigned to the file. An ISRC code is an 'International Standard Recording Code' that is used to internationally identify music as a unique release. ISWC (International Standard Musical Work Code) is a unique, permanent and internationally recognized ISO reference number for the identification of musical works. A UPC code is a 'Universal Product Code' that is used to track a music release. One or more of these codes are automatically assigned at steps 416, 418. Step 415 includes presenting the producer with his or her "per download/stream" rates. At step 420 the producer is asked whether he or she wishes to release the remix file through Remix Hits. If the user answers no at step 426, then the user has no rights release the track. The producer then has personal consumption rights only.

Continuing with the workflow of FIGS. 4A and 4B, the producer at step 420 is asked whether he or she wishes to release the remix file through Remix Hits. If the user answers yes 428, the user is brought to a white label DART platform 429 under an embodiment. At step 430 the user or producer is reminded of his or her "royalty" cuts. DART comprises a platform providing independent artists a means for submitting music to online music retailers. Under alternative embodiments Remix Hits may integrate with other music publishing systems that provide analogous functionality such as OpenPlay. Step 432 includes the DART platform tracking sales of the producer's product and royalties issued to rights holders. The workflow of FIGS. 4A and 4B shows that sales income may be split between one or more of musicians 434, publishers 436 (including writers 444), labels 438 (including artists 446), Remix Hits 440, and Remix artists 442.

As already indicated above, Remixes and derivative works are some of the fastest growing music creations today. But unfortunately for both remixers and original rights holder, the current royalty negotiation process is not able to keep up with speed of creation. At Remix Hits, we provide DJ producers the license to desired music while fairly compensating the entire music ecosystem including artists, songwriters, session musicians, recording artists, labels, publishers and producers.

The user may then post a new remix for analysis. The user selects the "Upload New" tab to upload/post the remix. A stem scanning technology then scans the uploaded remix to identify the original content within the audio file and copyrighted material in the file. Based on original versus copyright usage, the copyright management system generates royalty splits.

Continuing with the example given above, a producer/remixer may combine samples from a copyrighted country song and a copyrighted Latin song. The producer of the remix uploads the remix product into the stem scanner which analyzes the audio segment. In this example, the producer has used exclusively copyright material. Accordingly, most of the royalties are assigned to copyright holder (45% for each copyright holder). Nevertheless, 10% is assigned to the remix creator. And the new remix is considered legal for release through all major music distributors such as Spotify® and iTunes®.

Stem Detection Algorithm

Requirements

The service detects original stems after such stems are pitch shifted, time stretched and mixed with other sounds.

Peak Extraction

Figure 5:
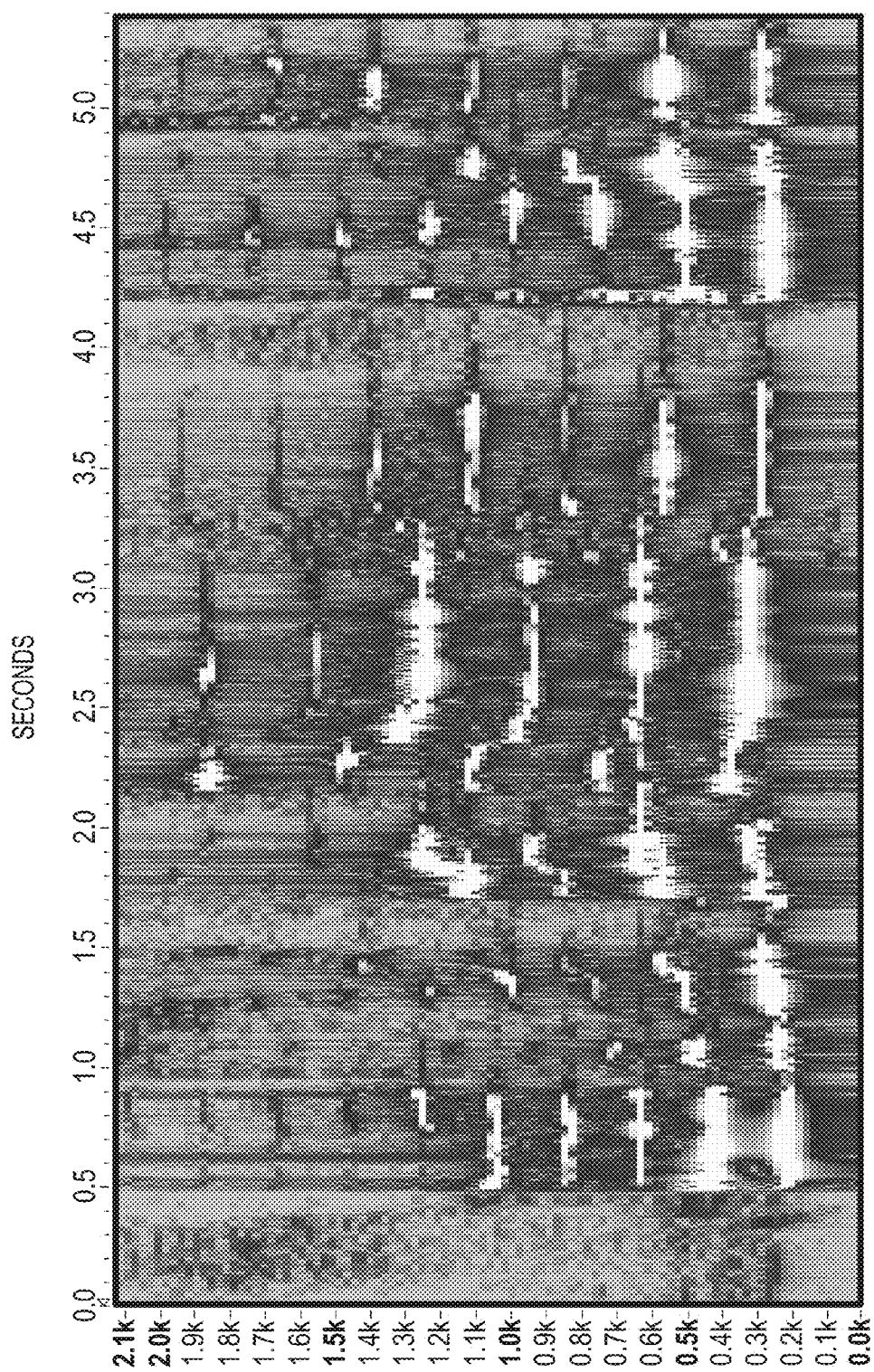
FIG. 5 shows a spectrogram, under an embodiment.

Every music sound can be represented as time, frequency and magnitude combination. This music sound representation is called its spectrum. A typical music sound spectrum is shown in FIG. 5.

In order to store unique information about a sound track, a Peak Algorithm is utilized as described above.

Analysis is based on the information returned by the Short Time Fourier Transformation (STFT). To achieve good resolution on higher and lower frequencies, the STFT is applied two times with normal window size and wide window size, respectively.

The STFT with normal window size provides higher resolution for higher frequencies, while the STFT with wide window provides better resolution on lower frequencies.

Both STFT operations are used (as described below) to extract and store unique information about the stems and mixed sound track.

Figure 6:
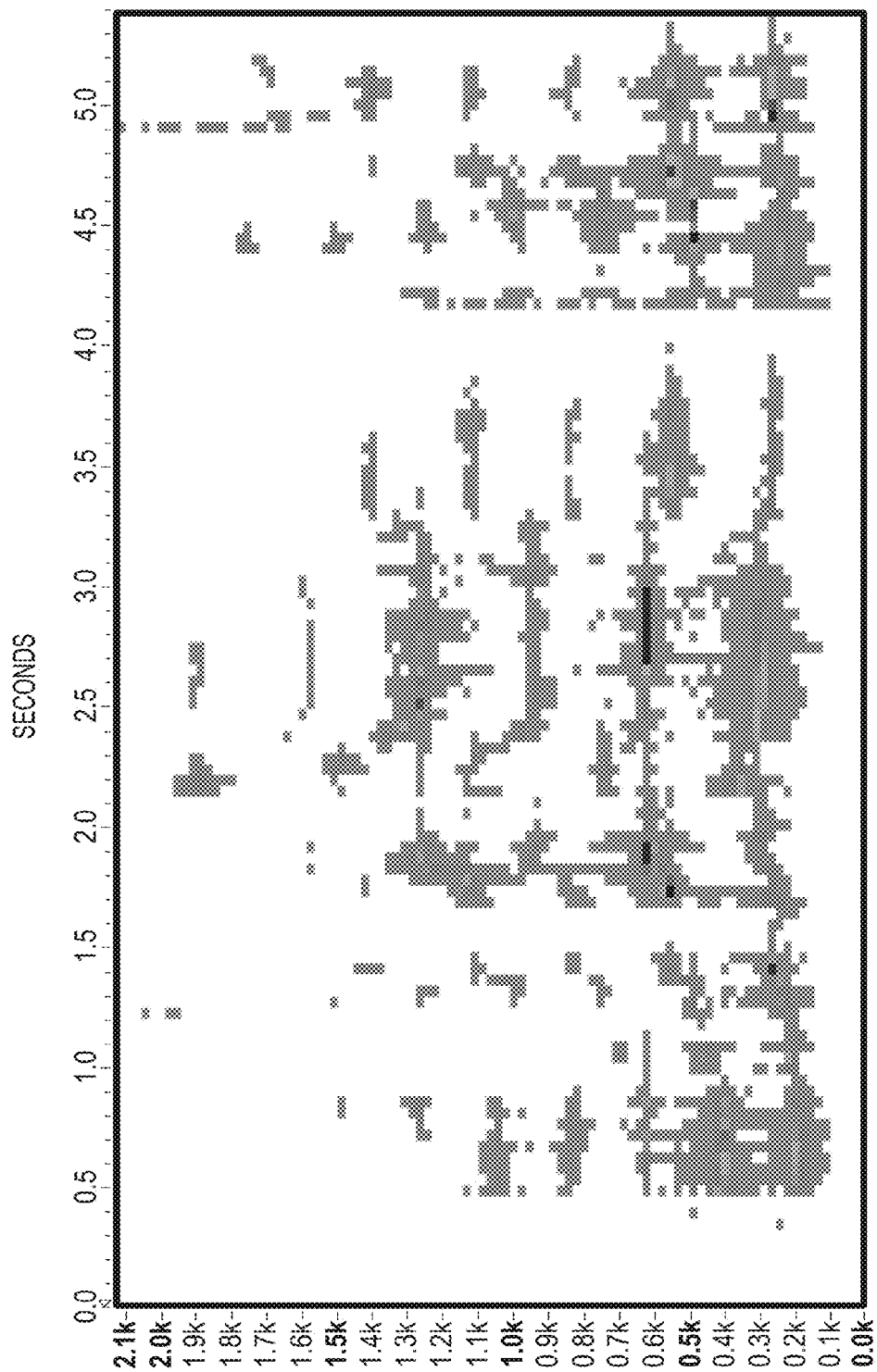
FIG. 6 shows filtered spectrogram data, under an embodiment.

As indicated above, every music sound can be represented as a time, frequency and magnitude combination, i.e. in the form of a spectrum. Under one embodiment, the spectrum data of a mixed audio file generated by the STFT may be filtered by removing all magnitudes lower than a threshold value, i.e. less than 3% out of the maximum magnitude values detected within the entire set of spectrum data for a mixed audio file. The result looks similar to FIG. 6.

Figure 7:
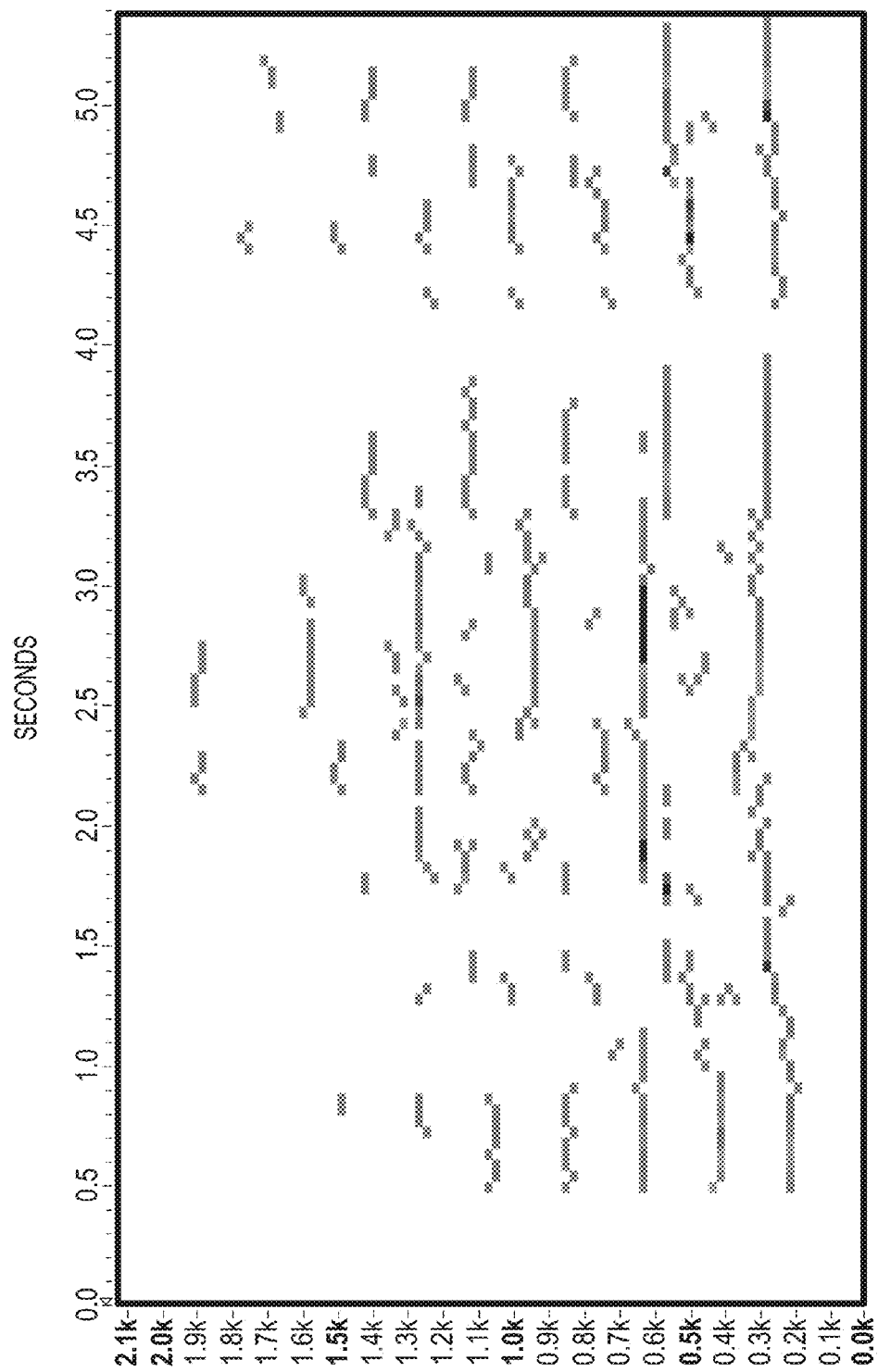
FIG. 7 shows filtered spectrogram data, under an embodiment.

Once all noise if filtered out, we find most valuable frequencies by locating local maximas in frequency bands. The result looks like FIG. 7. These maximas are recorded as Time-Frequency-Magnitude triplets and are stored in a system database.

Detection Process

Overview

Under one embodiment, a detection algorithm of StemScanner includes 3 main steps. A first step allows for fast filtering of matching candidates (extracted from mixed audio file) by rough comparison of the highest peak magnitude values within corresponding bands in stems and mixed audio file. As indicated above, this method compares peak values extracted from 3 second intervals of the mixed audio file against peak values identified in each database stem. This step finds the best possible matching times of the mixed audio file (candidate) and stem. This first step is repeated using a wider STFT to capture lower frequency candidates. As the final step, filtered candidates are analyzed using a correlation algorithm.

Step 1—Filter By High Energy Points.

The main idea of this step is that frequencies from the stem that carry energy, i.e. peak magnitude values, above a certain level will not be masked in mixed audio file by other sounds and thus can be easily extracted and compared back to the original file, i.e. to stems.

Operations are performed on all database stems with respect to the mixed audio spectrum data, i.e. data from each stem is successively compared to spectrum data sets extracted at three second intervals from the mixed audio file.

The mixed audio spectrum is initially filtered by removing peak magnitude values that are less than 3% of the maximum magnitude value detected in the entire mixed audio file. This allows elimination of noise and lowers false positive matching due to jittering on low energy frequencies.

Noise comprises magnitude values below 3% a max magnitude value in a given audio file. This noise is mostly likely sound from an original that is not needed in the analysis. A STFT might generate jittering (small magnitude variation) on the corresponding frequencies in this "noise range". This noise may comprise an absence of original sound in an audio file.

Following actions are performed:
1. Each stem is filtered by removing all magnitude points at a level below 30% of the maximum magnitude value detected in each in stem.
2. An algorithm under one embodiment looks for a match of energy points or peak magnitude values in each stem with peak magnitude values extracted from the mixed audio file in respective "three second" interval data sets.
3. If a filtered mixed audio file carries any peak magnitude within any of the "three second" interval data sets corresponding to a peak magnitude value in a stem at a corresponding frequency band, the algorithm reports a match. (As an example, 4 out of 10 stem peaks may pass the 30% threshold. These 4 peaks have to have corresponding "non-zero" values in the filtered (3%) mix file).

The above steps are performed for all stems in the stem database.

Once this step is complete, we have a list of candidates, i.e. a list of three second intervals, with matching information (time in mix and time in stem). "Time in mix" comprises the beginning of a 3 second interval within a mixed audio file. "Time in stem" comprises the beginning of the same 3 second interval within an original stem. For example, a 3 second interval of original audio (second 19 . . . 21), i.e. "time in stem", may be detected at seconds 10 . . . 13 of the mix, i.e. "time in mix". (Note that stems may comprise three second intervals. However, the terms stem alone is often use in this application as a matter of convenience).

Step 2—Filter High Energy Points With Wider STFT Window

In this step we use the candidates produced by the step above. Candidates that include more information at lower versus higher frequencies may represent false positives.

Since musical frequencies are logarithmic in nature, lower notes may fall into a common frequency band. Thus, if a candidate includes more information on lower frequencies and not much information on higher frequencies, the candidate may pass the first step.

To filter such candidates out we have to perform a more precise comparison on lower frequencies. For this purpose we will be using stem and spectrum data generated with a wider STFT window.

Actions described in this step are performed for time ranges of the candidates identified by the first step only. If energy points match—candidate is passed to the next step. The same comparison performed above with respect to high frequency candidates is performed at this step.

Step 3—Analysis of Higher Frequency Bands

On this step we have a set of candidates (produced by step one using a normal window STFT and filtered at step two using larger winder STFT) which need to be looked at more closely in order to filter out false positives.

The previous steps provide a list of candidates that have high energy points appearing at the same time as in the stems. In other words, the previous steps provide us with information of starting points of 3 second intervals in the stem and in the mixed audio file. At this point magnitudes of from the stem and the three second mix intervals are loaded and correlated to confirm that the frequencies behave in a similar way in the stems and the mix intervals. Peak magnitude values in mix candidate must sufficiently correlate with peak magnitude values in stems.

To check similarity of energy point relationships, the following steps are performed:
1. Stem peak magnitude values are generated using STFT (regular size window).
2. Magnitude values are extracted from mixed audio file for the identified candidates.
3. Both sets are run through a correlation algorithm in order to detect the level of similarity. A Pearson correlation is computed but embodiments are not so limited.
4. If the correlation algorithm yields a result lower than some specific threshold, the candidate is filtered out.

Candidates passing all three steps are considered as stems used in the mixed audio file with very high probability.

Stem Detection Algorithm

Introduction

An additional embodiment of the RMXHTZ Hits platform and stem analysis approach is described below. The service detects original stems after such stems are pitch shifted, time stretched and mixed with other sounds.

To perform sound analysis, the short-time Fourier transform is used to generate a spectrum for both the Stem and the Mix. Spectrums are filtered to remove noise and non-information-bearing magnitudes. Once filtering is completed, the following matching operations are performed:

Frame Matching—point-by-point matching of filtered amplitudes of the stem matches corresponding ones on the mix Empty Window Detection—removing any candidate having non-empty spectrum in the stem and empty Spectrum in the mix Fingerprint Correlation—correlation of stem magnitude peaks with corresponding points in an audio mix via Pearson's Correlation formula Blob Analysis—comparison of continuous areas of filtered non-zero magnitudes of the stem and mix.

Metadata Extraction

Figure 8:
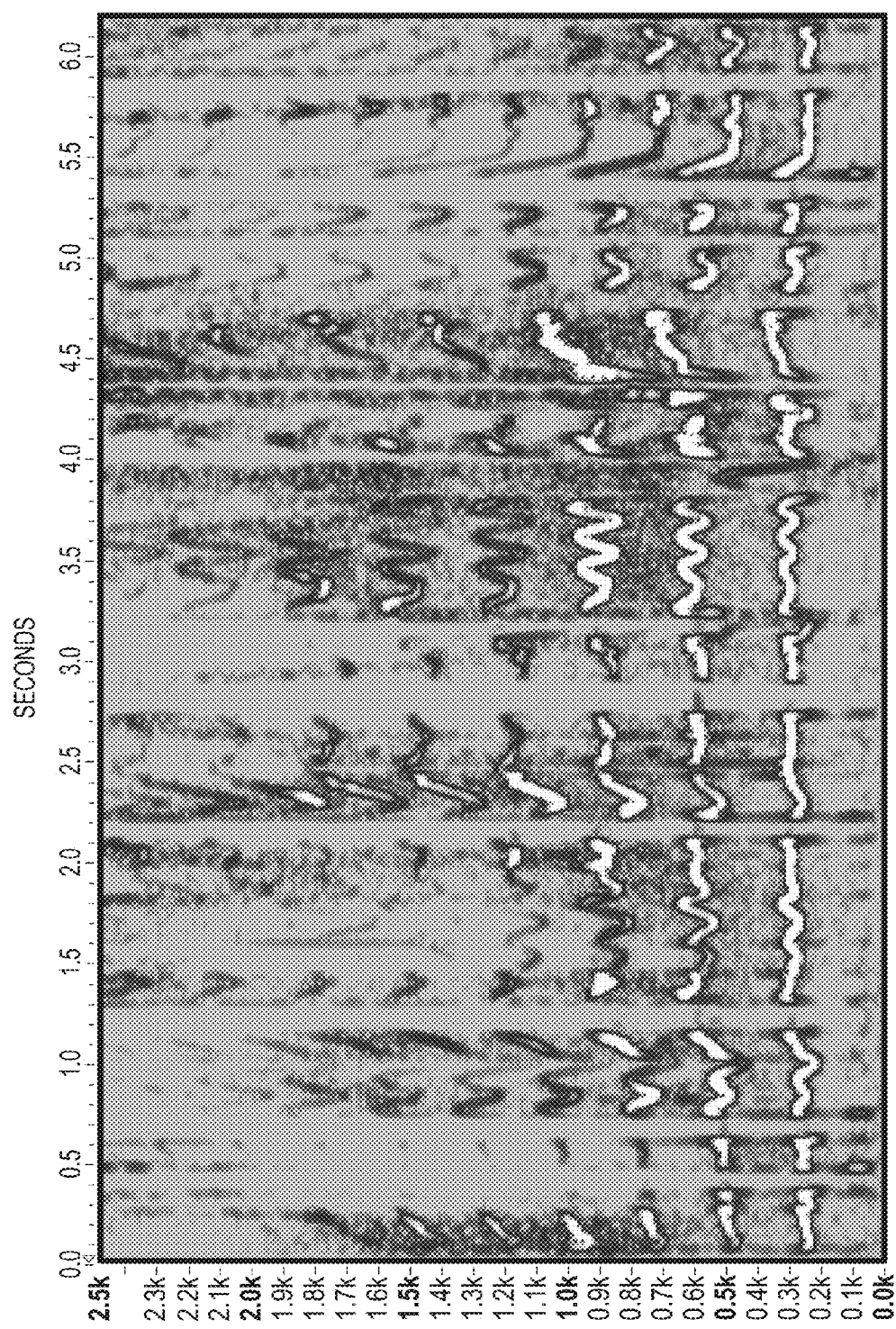
FIG. 8 shows a spectrogram, under an embodiment.

According to the Fourier transform every music signal can be represented as a sum of harmonic oscillations called frequency response of the music signal. The Discrete Fourier transform (DFT) is used for digital music data, and the Fast Fourier transform (FFT) is used for the fast computation of the DFT. Because music signals are time-varying signals the classic Fourier transform is not sufficient to analyze them, and the Short-time Fourier transform (SIFT) is used. The resulting time-frequency function of a music signal is called its spectrum and a visual representation of the spectrum is a spectrogram . A typical music sound spectrogram is shown in FIG. 8.

For all input music sounds the Remix Hits platform resamples them to 44100 Hz and changes depth to 16 bits. All the music sounds shorter than a configurable number of seconds, 3-5 in practice, are discarded as uninformative.

Remix Hits refers to original music sounds as stems and recognition music sounds as a mix or mixed audio.

For the building of sound spectrums Remix hits uses STFT with 4096 window size and with Hann window function to mitigate spectral leaking.

For each stem, the Remix Hits platform builds 2 spectrums: one spectrum with no overlapping (spectrum1) and another spectrum with 35% overlapping (spectrum2). Each spectrum is represented as a 2-dimensional array (matrix): rows are frequency ranges (bins), columns are time ranges (windows), values are average magnitudes for the frequency-time range. Bin width is calculated based on the following formula: (Sample_Rate/2)/(Window_Size/2). Window width is calculated based on the following formula: (Window_Size*1000)/Sample_Rate).

For the 44100 Hz sample rate and 4096 window the bin width would be (44100/2)/(4096/2)=10.8 Hz. The window length would be (4096*1000)/44100=92.88 ms. Spectrum bins below 100 Hz and above 5 kHz are filtered out as non-informative. The phase component is discarded. The amplitudes are normalized according to the Fletcher-Munson curves.

Spectrum2 is saved to storage and used for detailed sound analysis later (including Blob analysis) as further described below.

Figure 9:
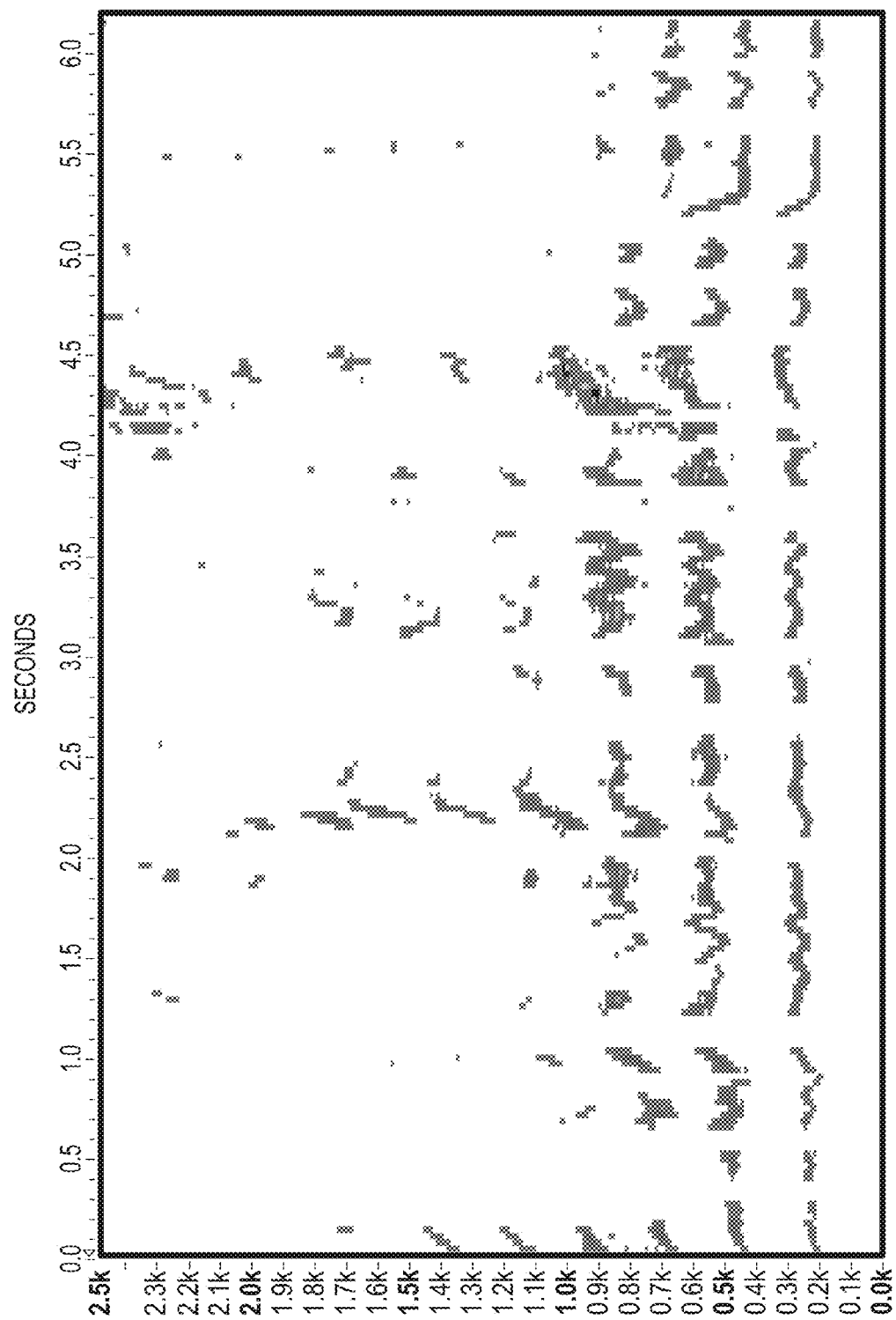
FIG. 9 shows filtered spectrogram data, under an embodiment.

Values in the spectrum1 are filtered: the maximum magnitude in the spectrum is found and all values having 3% or less of maximum magnitude got deleted. The filtered spectrogram looks similar to FIG. 9.

Figure 10:
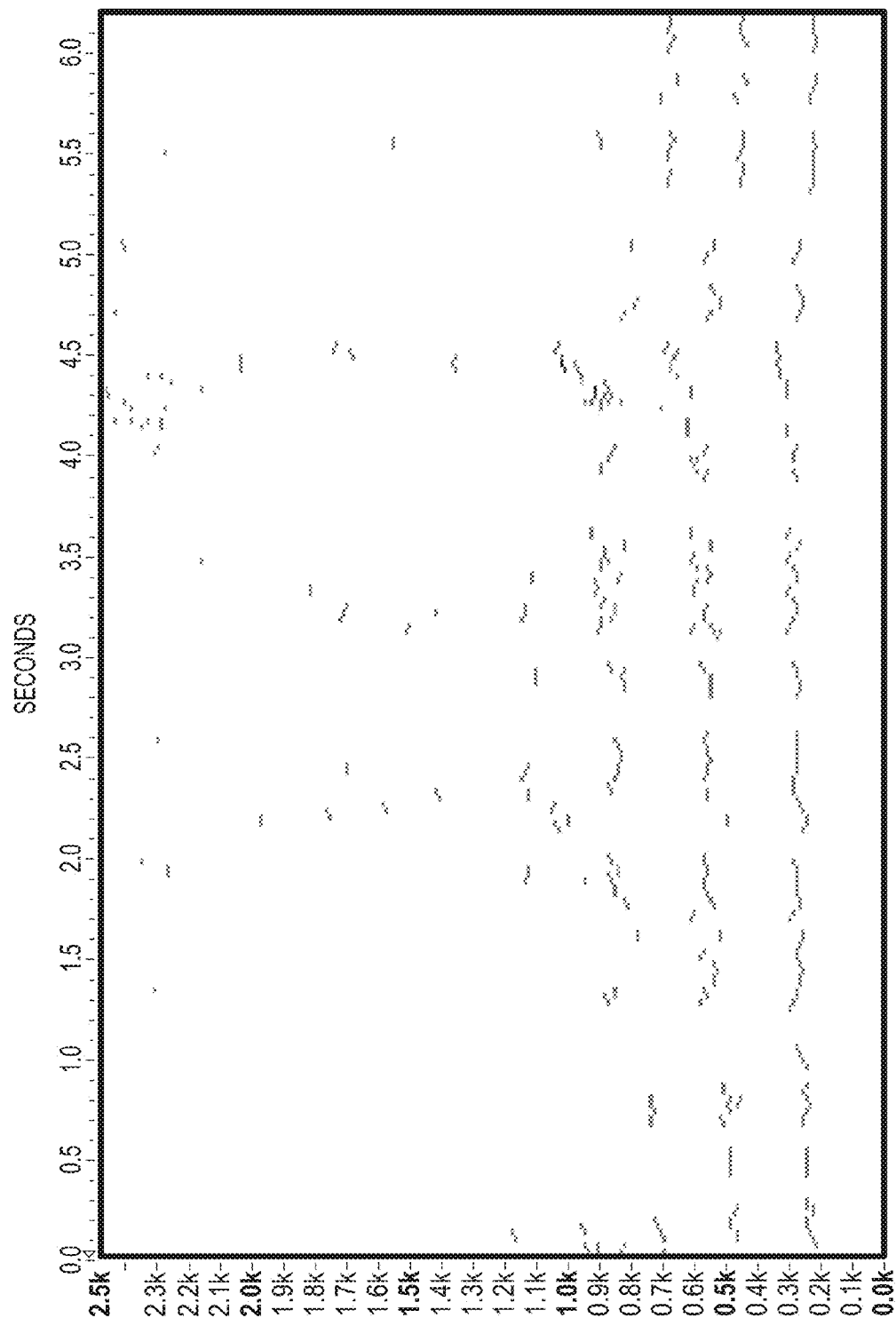
FIG. 10 shows filtered spectrogram data, under an embodiment.

Spectrum1 is used to build so called Fingerprints. A Fingerprint represents a simplified version of the spectrum. Simplification is done by keeping bins whose values are greater than neighbors (i.e. bin[n]>bin[n−1] and bin[n]>bin[n+1]). Not that this is vertical comparison across neighboring bins After the spectrum is filtered using the vertical comparison, an additional filter checks for any isolated values (i.e., those having no neighbors in either the vertical or horizontal direction) and drops them. The constructed Fingerprint is then saved to storage and looks like FIG. 10.

During the recognition process we match 3-5 second time intervals in stems with 3-5 second time intervals in mixes. So we need divide our fingerprints into 3 seconds time intervals called frames. Each frame contains 32 windows from a corresponding fingerprint under an embodiment. The offset for each consecutive frame is 5 windows. That is $Frame_0$ is built out of window 0 through 32, $Frame_1$ is build out of windows 5 through 37, $Frame_2$ is built out of windows 10 through 42 and so on.

For each Frame additional filtering is performed in order to minimize calculation overhead during recognition process. Maximum amplitude for the whole frame is calculated and any point value less than 30% of that maximum magnitude is stripped out under an embodiment.

Frames are then filtered under an embodiment to remove ones corresponding to non-informative portions of the Spectrum 1:
1. For each frame of Spectrum1 the number of empty windows ($L_{empty}$) and maximum length of consecutive empty windows ($L_{cont}$) are calculated and compared to the total length of the frame (L). If any of following conditions met the frame is discarded: (a) $L_{empty}$>0.5*L or (b) $L_{cont}$>0.3*L.
2. For each frame of Spectrum1 the Remix Hits platform calculates a number of non-zero values in Spectrum1 bins above $N_{hi}$ of 2 kHz and below $N_{lo}$ of 2 kHz. If $N_{hi}/(N_{hi}+N_{lo})$<0.1 or $N_{lo}/(N_{hi}+N_{lo})$<0.1 frames get deleted.

Recognition

Every input Mix is compensated for time-stretch (−20% . . . +20% in 5% increments) and pitch-shift (−5 . . . +5 semitones in single increments) resulting in 98 additional versions of the audio mix. For each compensated version of the mix, Remix Hits builds two spectrums (i.e., a Spectrum1 and Spectrum2) in same way as corresponding spectrums are calculated for stems. Both of these spectrums are subjected to a 3% magnitude filter, i.e. the maximum magnitude in both spectrums is found and all values in the respective spectra having 3% or less of maximum magnitude are deleted. These computed spectrums are now ready for the mix recognition process under an embodiment.

The mix recognition process performs the following steps: frames matching, stem-mix filtering, fingerprint correlation, blobs analysis, and local peaks matching. The recognition process is executed for each version of the mix. Matching results are aggregated, sorted and filtered.

Frame Matching

For each Stem in storage all Frames are loaded. Sets of windows ($Spectrum_{mix}$) are constructed using the audio mix. These sets of windows correspond to consecutive 3 second time intervals extracted from the Mix. The $Frame_{stem}$ is then compared to the Spectrum $_{mix}$. If all points in $Frame_{stem}$ have corresponding points in $Spectrum_{mix}$ then the pair is saved for further filtering.

Upon completion of this step there is a list of $Frame_{stem}$ and Spectrum. pairs. This list is called the Matching Candidates list.

Empty Windows Detection

Since not all information from an original stem makes it to $Frame_{stem}$, Matching Candidates require further analysis. For each Matching Candidate pair, the following filter is applied under an embodiment: for each non-empty window (i.e., empty across all bins) in $Spetrum_{stem}$, the corresponding $Spectrum_{mix}$ window must also be non-empty (i.e., empty across all bins). If this condition is not met, the pair is deleted from the Matching Candidates list.

Fingerprint Correlation

For each remaining pair, each corresponding stem fingerprint is loaded. Then $Fingerprint_{stem}$ and $Spectrum_{mix}$ matched so that every point in $Fingerprint_{stem}$ should have a corresponding non-zero point in $Spectrum_{mix}$. If less than 80% of $Fingerprint_{stem}$ points are matched then the candidate removed from the Matching Candidates list. If the 80% barrier passed then $Fingerprint_{stem}$ and $Spectrum_{mix}$ data are fed into Pearson's correlation function. If the result is lower than 0.5 the pair is dropped.

Blob Analysis

For this step the Remix Hits platform uses Spectrum2 (i.e. the overlapped spectrum) for the stem and Spectrum2 (i.e. the overlapped spectrum) for the mix. Both spectrums are de-noised by removing values below 3% of a maximum magnitude detected in the respective spectrums.

Depending on the number ($N_{nz}$) of non-zero points left in the audio mix spectrum, Remix Hits defines and applies additional de-noising filtering coefficients for both the mix and stem. The more points left in mix the higher filtering coefficient applied. If more than 50% of points are left in the mix, the candidate is dropped as overfilled.

De-noised spectrums are checked for matching non-zero values. If less than 70% of matching points are left, the candidate is dropped. In other words, Remix Hits loads points from stem data and matches them against mix data. If less than 70% match, then the candidate pair is dropped.

Figure 11:
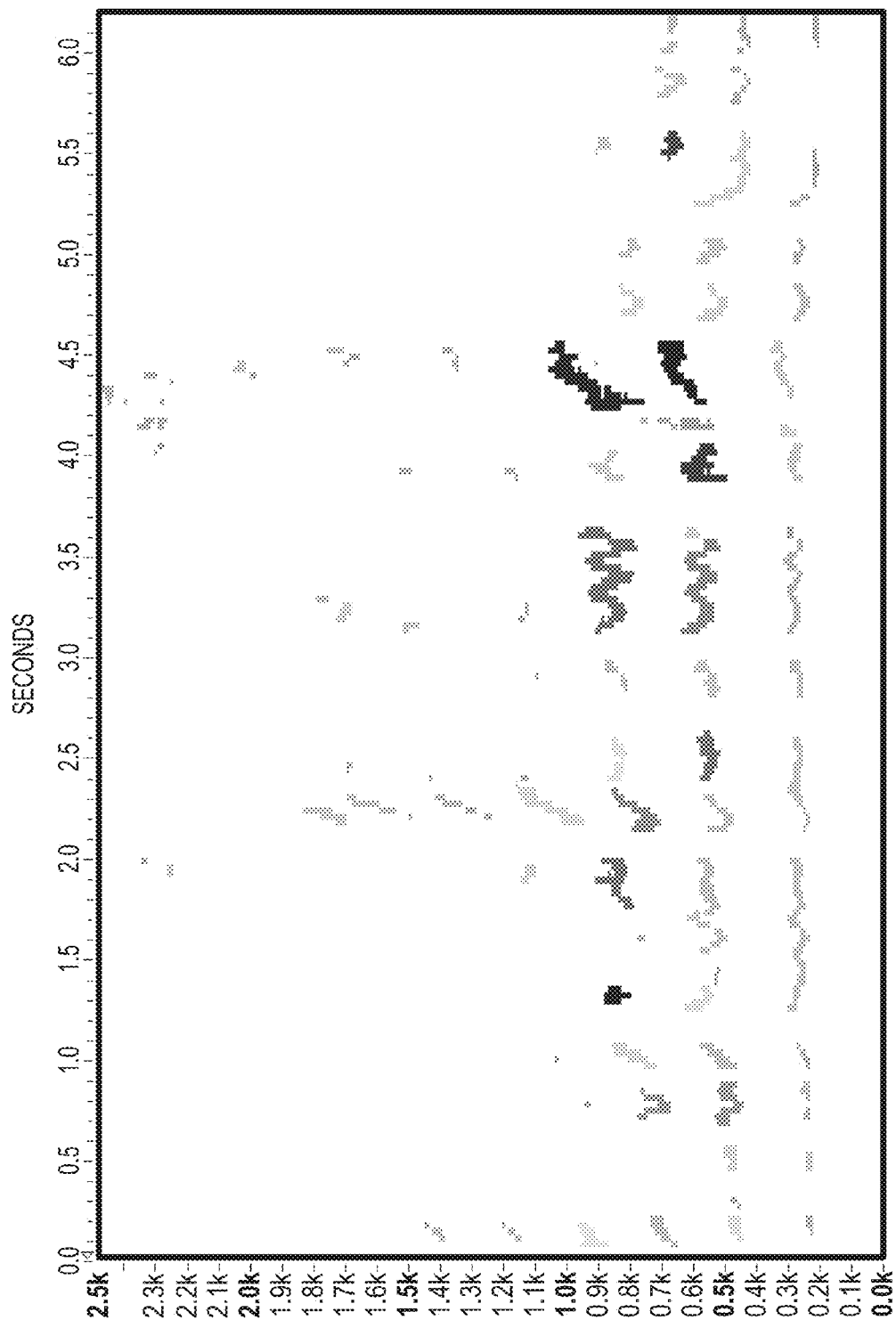
FIG. 11 shows the results of a blob analysis, under an embodiment.

For survived candidates the Remix Hits platform extracts so-called "blobs" in the stem, i.e. continues areas of non-zero magnitudes (see FIG. 11). For each blob the average magnitude is calculated. A list of average magnitudes for stem blob values and corresponding mix magnitudes are fed into Pearson's correlation formula. If the result is above 0.7, then the candidate survives.

At this point a Matching Candidates list is returned as final result.

Figure 12:
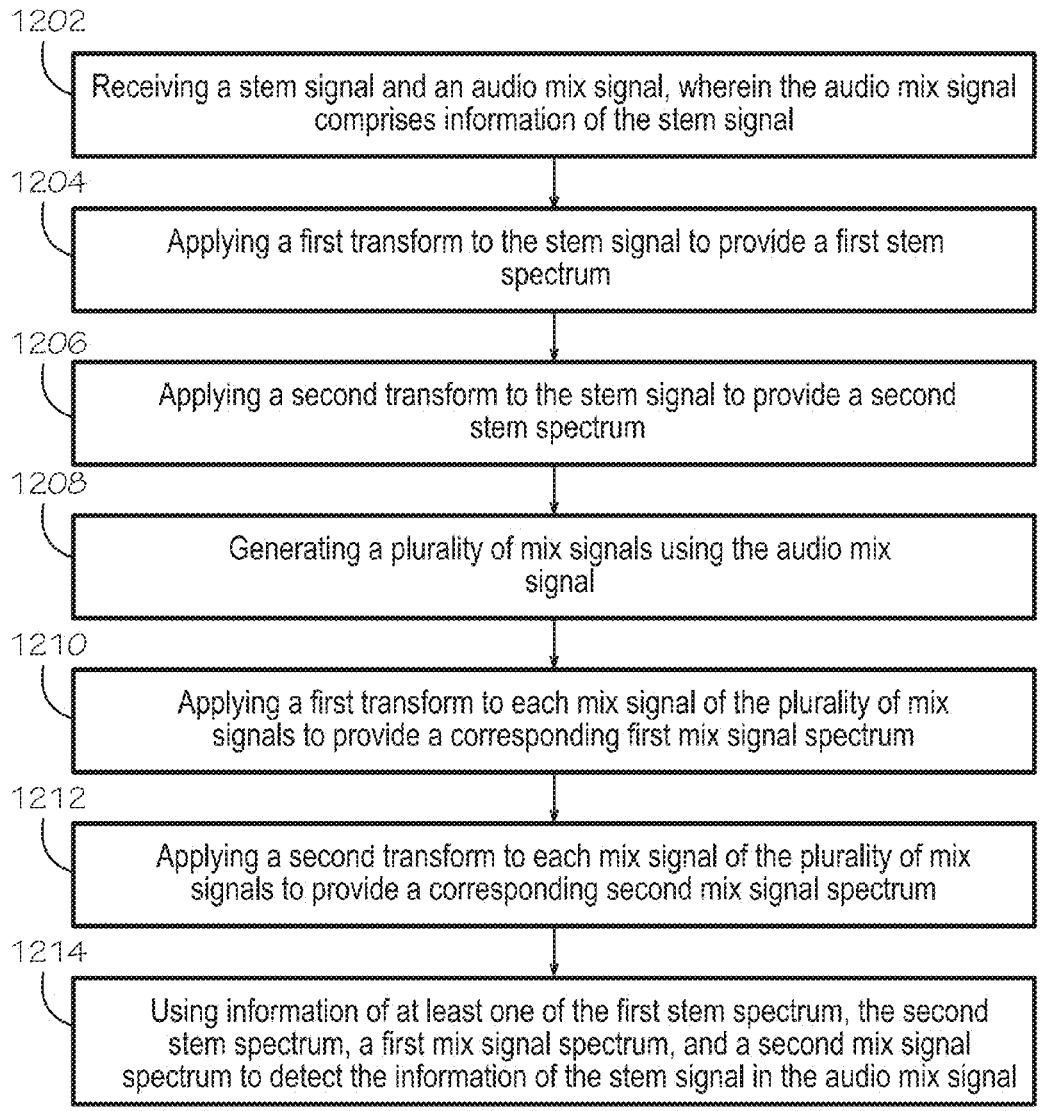
FIG. 12 shows a method for detecting information of a stem within a mixed audio signal, under an embodiment.

FIG. 12 shows a method for detecting information of a stem within a mixed audio signal. The method includes the step 1202 of receiving a stem signal and an audio mix signal, wherein the audio mix signal comprises information of the stem signal. The method includes the step 1204 of applying a first transform to the stem signal to provide a first stem spectrum. The method includes the step 1206 of applying a second transform to the stem signal to provide a second stem spectrum. The method includes the step 1208 of generating a plurality of mix signals using the audio mix signal. The method includes the step 1210 of applying a first transform to each mix signal of the plurality of mix signals to provide a corresponding first mix signal spectrum. The method includes the step 1212 of applying a second transform to each mix signal of the plurality of mix signals to provide a corresponding second mix signal spectrum. The method includes the step 1214 of using information of at least one of the first stem spectrum, the second stem spectrum, each first mix signal spectrum, and each second mix signal spectrum to detect the information of the stem signal in the audio mix signal.

A method of an embodiment comprises receiving a stem signal and an audio mix signal, wherein the audio mix signal comprises information of the stem signal. The method includes applying a first transform to the stem signal to provide a first stem spectrum. The method includes applying a second transform to the stem signal to provide a second stem spectrum. The method includes generating a plurality of mix signals using the audio mix signal. The method includes applying a first transform to each mix signal of the plurality of mix signals to provide a corresponding first mix signal spectrum. The method includes applying a second transform to each mix signal of the plurality of mix signals to provide a corresponding second mix signal spectrum. The method includes using information of at least one of the first stem spectrum, the second stem spectrum, a first mix signal spectrum, and a second mix signal spectrum to detect the information of the stem signal in the audio mix signal.

The first transform of an embodiment comprises a short time fourier transform using a window size of 4096 and using a Hann window function to mitigate spectral leaking.

The second transform of an embodiment comprises the first transform applied with thirty five percent overlapping.

The method of an embodiment comprises storing the first stem spectrum, the second stem spectrum, each first mix signal spectrum, and each second mix signal spectrum as an array of values.

An x-axis of each array comprises time ranges, wherein each time range comprises a window, under embodiment.

A y-axis of each array comprises frequency ranges, wherein each frequency range comprises a bin, under an embodiment.

Array values of an embodiment comprise average magnitude values for time and frequency ranges, wherein time and frequency ranges comprise points of an array.

The method of an embodiment includes filtering the first stem spectrum, the filtering the first stem spectrum comprising identifying the maximum magnitude value of the first stem spectrum and removing all values less than three percent of the maximum magnitude value.

The filtering the first stem spectrum comprises under an embodiment building a fingerprint, wherein the fingerprint comprises a simplified version of the first stem spectrum.

The building the fingerprint comprises under an embodiment preserving only magnitude values that are greater than immediately adjacent bin values.

The building the fingerprint comprises under an embodiment eliminating remaining magnitude values without any immediately adjacent bin and window values.

The method of an embodiment includes dividing the fingerprint into three second frames, wherein the offset for each consecutive frame comprises 5 windows.

The method of an embodiment comprises calculating for each frame the number of empty windows (Lempty) and maximum length of consecutive empty windows (Lcont) and deleting a frame if Lempty>0.5*L or Lcont>0.3*L.

The method of an embodiment comprises calculating for each surviving frame a number of non-zero values (Nhi) in bins above 2 kHz and a number of non-zero values (Nlo) in bins below 2 kHz and deleting a frame if Nhi/(Nhi+Nlo)<0.1 or Nlo/(Nhi+Nlo)<0.1.

The method of an embodiment includes filtering each first mix signal spectrum, the filtering each first mix signal spectrum comprising identifying the maximum magnitude value of each first mix signal spectrum and for each first mix signal spectrum removing all values less three percent of the respective maximum magnitude value.

The method of an embodiment includes dividing each first filtered mix spectrum into three second consecutive spectrum mix frames.

The method of an embodiment comprises comparing surviving frames with corresponding spectrum mix frames, wherein each compared frame and spectrum mix frame comprise a candidate pair.

The comparing under an embodiment comprises determining for each candidate pair a condition that all non-empty points in the frame have corresponding non-empty points in the spectrum mix frame and deleting candidate pairs that do not meet this condition.

The method of an embodiment comprises for each surviving candidate pair populating each frame with corresponding information of the first stem spectrum.

The method of an embodiment comprises determining for each surviving candidate pair a condition that each non empty window in the populated first stem spectrum frame corresponds to a non-empty window in the spectrum mix frame and deleting candidate pairs that do not meet this condition.

The method of an embodiment comprises for each surviving candidate pair populating each frame with corresponding information of the fingerprint.

The method of an embodiment comprises determining for each surviving candidate pair a condition that at least eighty percent of the non-empty points in the populated fingerprint frame correspond to a non-empty point in the spectrum mix frame and deleting candidate pairs that do not meet this condition.

The method of an embodiment comprises determining for each surviving candidate a Pearson's correlation between the populated fingerprint frame and the spectrum mix frame and deleting candidate pairs with a Pearson's correlations below 0.5.

The method of an embodiment comprises de-noising the second stem spectrum for the stem and the second mix signal spectrum for each mix signal of the plurality of mix signals, the de-noising including removing values below three percent of a maximum magnitude detected in the respective spectrums.

The method of an embodiment comprises for each surviving candidate pair, populating each frame with corresponding information of the second stem spectrum and populating each spectrum mix frame with corresponding information of the second mix signal spectrum.

The method of an embodiment comprises for each surviving candidate pair applying additional de-noising coefficients to the populated second stem spectrum frame and the populated second mix signal spectrum frame based on the number of points remaining in the populated second mix signal spectrum frame and deleting candidate pairs when points left in the populated second mix signal spectrum frame exceed fifty percent.

The method of an embodiment comprises determining for each surviving candidate pair a condition that at least seventy percent of non-empty points in the populated second stem spectrum frame correspond to non-empty points in the populated second mix signal spectrum frame and deleting candidate pairs that do not meet this condition.

The method of an embodiment comprises computing for each surviving candidate continuous areas of non-zero magnitudes in the populated second stem spectrum frame and determining for the continuous areas an average magnitude.

The method of an embodiment comprises computing for each surviving candidate a Pearson's correlation between the average magnitude values and corresponding values in the populated second mix signal spectrum frame and deleting candidates when the Pearson's correlation is less than 0.7.

The detecting the information of the stem signal in the audio mix signal comprising returning the surviving candidates as positive matches, under an embodiment.

The U.S. Provisional Patent Application No. 62/296,392, filed Feb. 17, 2016, is incorporated herein by reference in its entirety to the same extent as if it were included herein.

The U.S. Provisional Patent Application No. 62/341,297, filed May 25, 2016, is incorporated herein by reference in its entirety to the same extent as if it were included herein.

The following references are incorporated herein by reference to the same extent as if they were included herein:

Avery Li-Chun Wang, "An Industrial-Strength Audio Search Algorithm".

J. Salamon and E. Gómez, "Melody Extraction from Polyphonic Music Signals using Pitch Contour Characteristics".

Computer networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like.

Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The systems and methods for analyzing stem components of audio files can be a component of a single system, multiple systems, and/or geographically separate systems. The systems and methods for analyzing stem components of audio files can also be a subcomponent or subsystem of a single system, multiple systems, and/or geographically separate systems. The systems and methods for analyzing stem components of audio files components can be coupled to one or more other components (not shown) of a host system or a system coupled to the host system.

One or more components of the systems and methods for analyzing stem components of audio files and/or a corresponding interface, system or application to which the systems and methods for analyzing stem components of audio files is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that include the systems and methods for analyzing stem components of audio files can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or back-end networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the systems and methods for analyzing stem components of audio files and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods for analyzing stem components of audio files and corresponding systems and methods include: microcontrollers with memory (such as electronically erasable programmable read only memory (EEPROM)), embedded microprocessors, firmware, software, etc. Furthermore, aspects of the systems and methods for analyzing stem components of audio files and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the systems and methods for analyzing stem components of audio files and corresponding systems and methods is not intended to be exhaustive or to limit the systems and methods to the precise forms disclosed. While specific embodiments of, and examples for, the systems and methods for analyzing stem components of audio files and corresponding systems and methods are described herein for illustrative purposes, various equivalent modifications are possible within the scope of the systems and methods, as those skilled in the relevant art will recognize. The teachings of the systems and methods for analyzing stem components of audio files and corresponding systems and methods provided herein can be applied to other systems and methods, not only for the systems and methods described above.

The elements and acts of the various embodiments described above can be combined to provide further embodiments. These and other changes can be made to the systems and methods for analyzing stem components of audio files and corresponding systems and methods in light of the above detailed description.

We claim:
1. A method comprising,
receiving a stem signal and an audio mix signal, wherein the audio mix signal comprises information of the stem signal;
applying a first transform to the stem signal to provide a first stem spectrum;
applying a second transform to the stem signal to provide a second stem spectrum;
generating a plurality of mix signals using the audio mix signal;
applying a first transform to each mix signal of the plurality of mix signals to provide a corresponding first mix signal spectrum;
applying a second transform to each mix signal of the plurality of mix signals to provide a corresponding second mix signal spectrum;
using information of at least one of the first stem spectrum, the second stem spectrum, a first mix signal spectrum, and a second mix signal spectrum to detect the information of the stem signal in the audio mix signal.

2. The method of claim 1, wherein the first transform comprises a short time fourier transform using a window size of 4096 and using a Hann window function to mitigate spectral leaking.

3. The method of claim 2, wherein the second transform comprises the first transform applied with thirty five percent overlapping.

4. The method of claim 1, comprising storing the first stem spectrum, the second stem spectrum, each first mix signal spectrum, and each second mix signal spectrum as an array of values.

5. The method of claim 4, wherein an x-axis of each array comprises time ranges, wherein each time range comprises a window.

6. The method of claim 5, wherein a y-axis of each array comprises frequency ranges, wherein each frequency range comprises a bin.

7. The method of claim 6, wherein array values comprise average magnitude values for time and frequency ranges, wherein time and frequency ranges comprise points of an array.

8. The method of claim 7, filtering the first stem spectrum, the filtering the first stem spectrum comprising identifying the maximum magnitude value of the first stem spectrum and removing all values less than three percent of the maximum magnitude value.

9. The method of claim 8, the filtering the first stem spectrum comprising building a fingerprint, wherein the fingerprint comprises a simplified version of the first stem spectrum.

10. The method of claim 9, the building the fingerprint comprising preserving only magnitude values that are greater than immediately adjacent bin values.

11. The method of claim 10, the building the fingerprint comprising eliminating remaining magnitude values without any immediately adjacent bin and window values.

12. The method of claim 11, dividing the fingerprint into three second frames, wherein the offset for each consecutive frame comprises 5 windows.

13. The method of claim 12, comprising calculating for each frame the number of empty windows ($L_{empty}$) and maximum length of consecutive empty windows ($L_{cont}$) and deleting a frame if $L_{empty} > 0.5*L$ or $L_{cont} > 0.3*L$.

14. The method of claim 13, comprising calculating for each surviving frame a number of non-zero values ($N_{hi}$) in bins above 2 kHz and a number of non-zero values ($N_{lo}$) in bins below 2 kHz and deleting a frame if $N_{hi}/(N_{hi}+N_{lo})<0.1$ or $N_{lo}/(N_{hi}+N_{lo})<0.1$.

15. The method of claim 14, filtering each first mix signal spectrum, the filtering each first mix signal spectrum comprising identifying the maximum magnitude value of each first mix signal spectrum and for each first mix signal spectrum removing all values less three percent of the respective maximum magnitude value.

16. The method of claim 15, dividing each first filtered mix spectrum into three second consecutive spectrum mix frames.

17. The method of claim 16, comprising comparing surviving frames with corresponding spectrum mix frames, wherein each compared frame and spectrum mix frame comprise a candidate pair.

18. The method of claim 17, the comparing comprising determining for each candidate pair a condition that all non-empty points in the frame have corresponding non-empty points in the spectrum mix frame and deleting candidate pairs that do not meet this condition.

19. The method of claim 18, comprising for each surviving candidate pair populating each frame with corresponding information of the first stem spectrum.

20. The method of claim 19, comprising determining for each surviving candidate pair a condition that each non empty window in the populated first stem spectrum frame corresponds to a non-empty window in the spectrum mix frame and deleting candidate pairs that do not meet this condition.

21. The method of claim 20, comprising for each surviving candidate pair populating each frame with corresponding information of the fingerprint.

22. The method of claim 21, comprising determining for each surviving candidate pair a condition that at least eighty percent of the non-empty points in the populated fingerprint frame correspond to a non-empty point in the spectrum mix frame and deleting candidate pairs that do not meet this condition.

23. The method of claim 22, comprising determining for each surviving candidate a Pearson's correlation between the populated fingerprint frame and the spectrum mix frame and deleting candidate pairs with a Pearson's correlations below 0.5.

24. The method of claim 23, comprising de-noising the second stem spectrum for the stem and the second mix signal spectrum for each mix signal of the plurality of mix signals, the de-noising including removing values below three percent of a maximum magnitude detected in the respective spectrums.

25. The method of claim 24, comprising for each surviving candidate pair, populating each frame with corresponding information of the second stem spectrum and populating each spectrum mix frame with corresponding information of the second mix signal spectrum.

26. The method of claim 25, comprising for each surviving candidate pair applying additional de-noising coefficients to the populated second stem spectrum frame and the populated second mix signal spectrum frame based on the number of points remaining in the populated second mix signal spectrum frame and deleting candidate pairs when points left in the populated second mix signal spectrum frame exceed fifty percent.

27. The method of claim 26, comprising determining for each surviving candidate pair a condition that at least seventy percent of non-empty points in the populated second stem spectrum frame correspond to non-empty points in the populated second mix signal spectrum frame and deleting candidate pairs that do not meet this condition.

28. The method of claim 27, comprising computing for each surviving candidate continuous areas of non-zero magnitudes in the populated second stem spectrum frame and determining for the continuous areas an average magnitude.

29. The method of claim 28, comprising computing for each surviving candidate a Pearson's correlation between the average magnitude values and corresponding values in the populated second mix signal spectrum frame and deleting candidates when the Pearson's correlation is less than 0.7.

30. The method of claim 29, the detecting the information of the stem signal in the audio mix signal comprising returning the surviving candidates as positive matches.

* * * * *